(12) United States Patent
Milburn

(10) Patent No.: US 6,802,122 B2
(45) Date of Patent: Oct. 12, 2004

(54) METHOD OF MANUFACTURING AN ARTICLE

(75) Inventor: Richard G Milburn, Nottingham (GB)

(73) Assignee: Rolls-Royce plc, London (GB)

( * ) Notice: Subject to any disclaimer, the term of this patent is extended or adjusted under 35 U.S.C. 154(b) by 171 days.

(21) Appl. No.: 10/141,819

(22) Filed: May 10, 2002

(65) Prior Publication Data

US 2002/0174540 A1 Nov. 28, 2002

(30) Foreign Application Priority Data

May 26, 2001 (GB) .............................................. 0112876

(51) Int. Cl.$^7$ .......................... B21D 53/78; B63H 1/26
(52) U.S. Cl. ................. 29/889.72; 29/889.7; 29/421.1; 219/76.1; 416/232
(58) Field of Search .......................... 29/889.72, 889.7, 29/889.1, 402.16, 402.09, 421.1; 72/56, 58, 61; 228/215, 193, 125; 219/76.1, 73.11, 76.12, 76.17; 416/232, 233

(56) References Cited

U.S. PATENT DOCUMENTS

| | | | | |
|---|---|---|---|---|
| 3,564,689 A | * | 2/1971 | Hirtenlechner | 29/889.71 |
| 4,730,093 A | * | 3/1988 | Mehta et al. | 219/121.63 |
| 5,063,662 A | * | 11/1991 | Porter et al. | 148/671 |
| 5,207,371 A | * | 5/1993 | Prinz et al. | 228/125 |
| 5,465,780 A | * | 11/1995 | Muntner et al. | 164/516 |
| 5,469,618 A | * | 11/1995 | LeMonds et al. | 29/889.72 |
| 5,622,638 A | | 4/1997 | Schell | |
| 6,034,344 A | | 3/2000 | Ittleson | |
| RE37,562 E | * | 2/2002 | Clark et al. | 416/241 R |
| 6,418,619 B1 | * | 7/2002 | Launders | 29/889.7 |
| 2001/0022023 A1 | * | 9/2001 | Wallis | 29/889.72 |

FOREIGN PATENT DOCUMENTS

| | | |
|---|---|---|
| EP | 197268 A | 10/1986 |
| EP | 233339 A | 8/1987 |
| EP | 0568201 A | 11/1993 |
| GB | 2009635 A | 6/1979 |
| GB | 2228224 A | 8/1990 |
| GB | 2264446 A | 9/1993 |
| GB | 2 306 353 A | 5/1997 |
| GB | 2308321 A | 6/1997 |
| JP | 62101802 A | 5/1987 |
| JP | 62282796 A | 12/1987 |

* cited by examiner

*Primary Examiner*—Marc Jimenez
(74) *Attorney, Agent, or Firm*—W. Warren Taltavull; Manelli, Denison & Selter PLLC

(57) ABSTRACT

A gas turbine engine (10) fan outlet guide vane (34) is manufactured by diffusion bonding titanium alloy sheet metal workpieces (52, 54) together to form an in integral structure (66). A titanium alloy is weld deposited at predetermined positions (70, 72) and in a predetermined shape to build up bosses (42, 44) at the radially outer end (40) of the hollow integral structure (68). The integral structure (66) is inflated at high temperature to form a hollow integral structure (68) of predetermined aerofoil shape. Apertures (46, 48) are drilled through the bosses (42, 44) to enable the radially outer end (40) of the fan outlet guide vane (34) to be attached to a fan casing (32) of the gas turbine engine (10).

18 Claims, 3 Drawing Sheets

METHOD OF MANUFACTURING AN ARTICLE

FIELD OF THE INVENTION

The present invention relates to a method of manufacturing an article, particularly to a method of manufacturing an article from sheet metal workpieces and more particularly to a method of manufacturing an article from sheet metal workpieces by diffusion bonding and hot forming.

BACKGROUND OF THE INVENTION

It is known to manufacture an article from sheet metal workpieces by diffusion bonding and hot forming. In particular it is known to manufacture fan blades and fan outlet guide vanes for gas turbine engines by diffusion bonding a plurality of titanium sheet metal workpieces and then hot forming or superplastically inflating the diffusion bonded titanium sheet metal workpieces. These manufacturing process are described in our European patent EP0568201B1, European patent application EP1092485A1 and UK patent GB2306353B.

A problem with the manufacture of a fan outlet guide vane is that attachment features are required on the radially inner and outer ends of the fan outlet guide vane to enable the fan outlet guide vane to be attached at the radially inner end to a core engine casing and to be attached at the radially outer end to a fan casing.

Currently titanium pieces are forged to produce locally thickened end portions suitable for a fastener, a bolt, to pass through to retain the fan outlet guide vane on the core engine casing or fan casing. The titanium piece is machined to size and is welded to the radially inner end or radially outer end of the fan outlet guide vane.

This process is costly and the fan outlet guide vanes are relatively heavy due to the solid radially inner end portion and radially outer end portion of the fan outlet guide required to attach the fan outlet guide vane to the core engine casing and the fan casing.

A problem with the manufacture of a fan blade is that attachment features are required on the radially inner end of the fan blade to enable the fan blade to be attached at the radially inner end to a fan rotor.

Currently blocks of titanium are diffusion bonded to the surfaces of the titanium workpieces at the radially inner end of the fan blade to locally thicken the fan blade so that a dovetail root or firtree root may be formed as described in GB2306353B.

SUMMARY OF THE INVENTION

Accordingly the present invention seeks to provide a novel method of manufacturing an article from sheet metal workpieces which reduces, preferably overcomes, the above mentioned problems.

Accordingly the present invention provides a method of manufacturing a sheet metal article comprising forming a sheet metal article from at least one sheet metal workpiece, weld-depositing metal at at least one predetermined position and in a predetermined shape to build up a feature to net shape at the at least one predetermined position on the sheet metal article.

Preferably the method comprises selecting at least two sheet metal workpieces, assembling the at least two sheet metal workpieces in a stack of sheet metal workpieces, sealing the edges of the stack of sheet metal workpieces, diffusing bonding the stack of sheet metal workpieces in areas other than a predetermined pattern to form an integral structure, weld-depositing metal at at least one predetermined position and in a predetermined shape to build up a feature to net shape at the at least one predetermined position on the integral structure, and heating the integral structure and internally pressurising the interior of the integral structure to hot form at least one of the at least two metal workpieces to form a hollow integral structure of predetermined shape.

Preferably the method comprises weld-depositing metal at at least one predetermined position at one end of the hollow integral structure.

Preferably the method comprises weld-depositing metal at two predetermined positions.

The method may comprise weld-depositing metal at both ends of the hollow integral structure, weld-depositing the metal in a predetermined position and in a predetermined shape to build up features to net shape at both ends of the hollow integral structure.

The method may comprise weld-depositing metal at both sides at one end of the hollow integral structure, depositing the metal in a predetermined position and in a predetermined shape to build up a feature to net shape at both sides of the hollow integral structure.

The method may comprise weld-depositing metal at both sides at both ends of the hollow integral structure, depositing the metal in a predetermined position and in a predetermined shape to build up a feature to net shape at both sides at both ends of the hollow integral structure.

The method may comprise weld-depositing metal at one end and at one side of the hollow integral structure, depositing the metal in a predetermined position and in a predetermined shape to build up a feature to net shape at one end and on one side of the hollow integral structure.

Preferably the article is a fan outlet guide vane or a compressor vane.

Preferably the method comprises weld-depositing the metal to build up a boss at at least one end of the article.

Preferably the method comprises drilling an aperture through the boss.

Alternatively the article is a fan blade or compressor blade.

The method may comprise weld-depositing the metal to build up a dovetail root or a firtree root at one end of the article.

Preferably the sheet metal article comprises titanium or a titanium alloy.

Preferably the method comprises weld-depositing titanium or a titanium alloy.

Preferably the titanium alloy comprises 6 wt % Al, 4 wt % vanadium and the balance is titanium plus incidental impurities.

Alternatively the sheet metal article comprises a nickel alloy. Alternatively the method comprises weld-depositing a nickel alloy. Preferably the nickel alloy comprises 19 wt % Cr, 18 wt % Fe, 5 wt % Nb, 3 wt % Mo, 0.9 wt % Ti, 0.5 wt % Al and the balance Ni plus incidental impurities.

Preferably a stop off material is applied in a predetermined pattern to at least one surface of at least one of the at least two sheet metal workpieces before assembling the at least two sheet metal workpieces in a stack of sheet metal workpieces.

BRIEF DESCRIPTION OF THE DRAWINGS

The present invention will be more fully described by way of example with reference to the accompanying drawings in which.

DETAILED DESCRIPTION OF THE INVENTION

Figure 1:
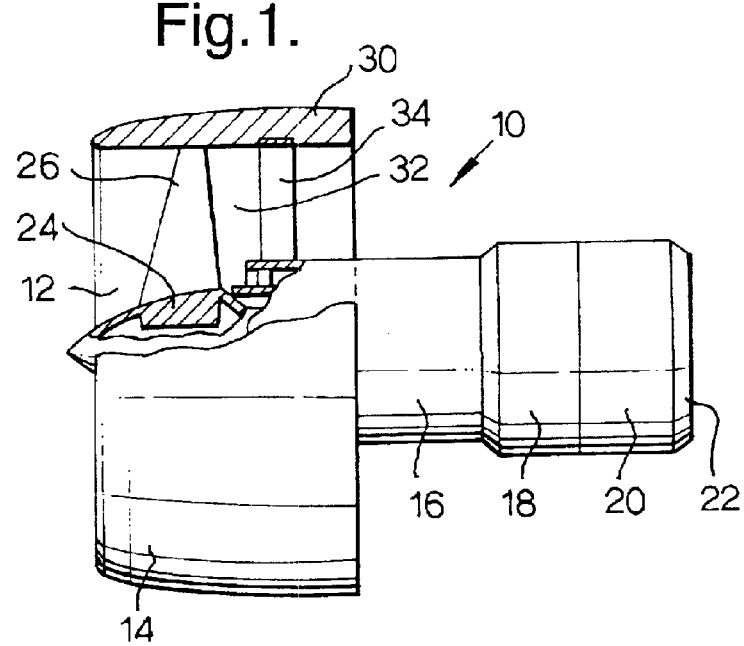
FIG. 1 shows a turbofan gas turbine engine comprising a sheet metal article manufactured according to the present invention.

A turbofan gas turbine engine 10, as shown in FIG. 1, comprises in flow series an inlet 12, a fan section 14, a compressor section 16, a combustion section 18, a turbine section 20 and an exhaust nozzle 22. The turbine section 20 comprises one or more turbines arranged to drive the compressor section 16 via one or more shafts (not shown) and one or more turbines arranged to drive the fan section 14 via one or more shafts (not shown).

The fan section 14 comprises a fan rotor 24, which carries a plurality of circumferentially arranged radially outwardly extending fan blades 26. The fan blades 26 are surrounded by a fan casing 30 arranged coaxially with the axis X of the turbofan gas turbine engine 10. The fan casing 30 partially defines a fan duct 32 and the fan casing 30 is secured to a core engine casing 32 by a plurality of radially extending fan outlet guide vanes 34.

Figure 2:
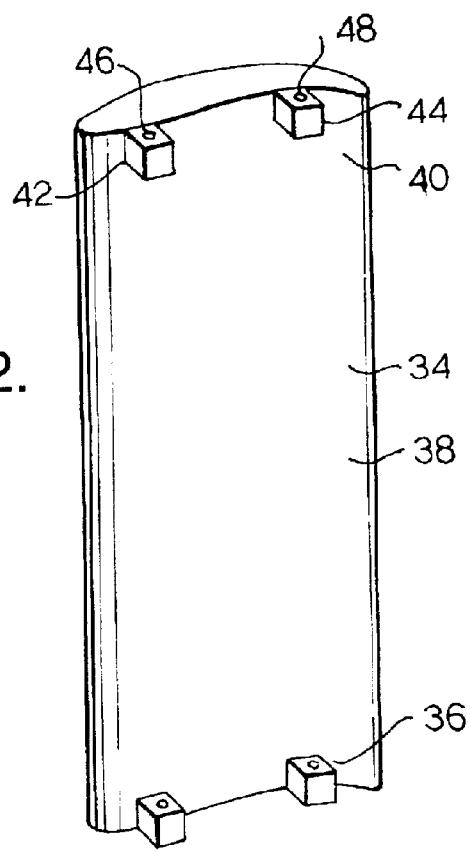
FIG. 2 is an enlarged view of a sheet metal fan outlet guide vane manufactured according to the present invention.

Each fan outlet guide vane 34, as shown more clearly in FIG. 2, comprises a radially inner end 36, an aerofoil portion 38 and a radially outer end 40. The radially outer end 40 has two axially spaced bosses 42 and 44 through which apertures 46 and 48 respectively are formed. The apertures 46 and 48 enable fasteners, for example bolts, to secure the radially outer end 40 of the fan outlet guide vane 34 to be secured to structure 50 on the fan casing 30. The apertures 46 and 48 are arranged radially to allow the bolts to pass radially through respective apertures in the fan casing 30. The fan outlet guide vane 34 is a hollow integral structure, which has been formed by diffusion bonding and hot forming two sheet metal workpieces.

Figure 3:
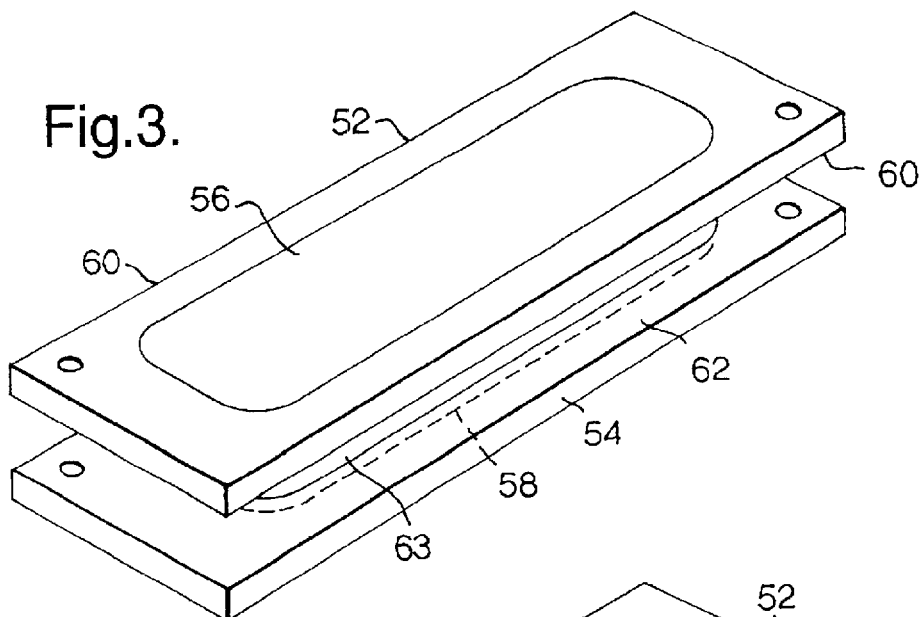
FIG. 3 is an exploded view of a stack of sheet metal workpieces used to manufacture the fan outlet guide vane shown in FIG. 2.
Figure 4:
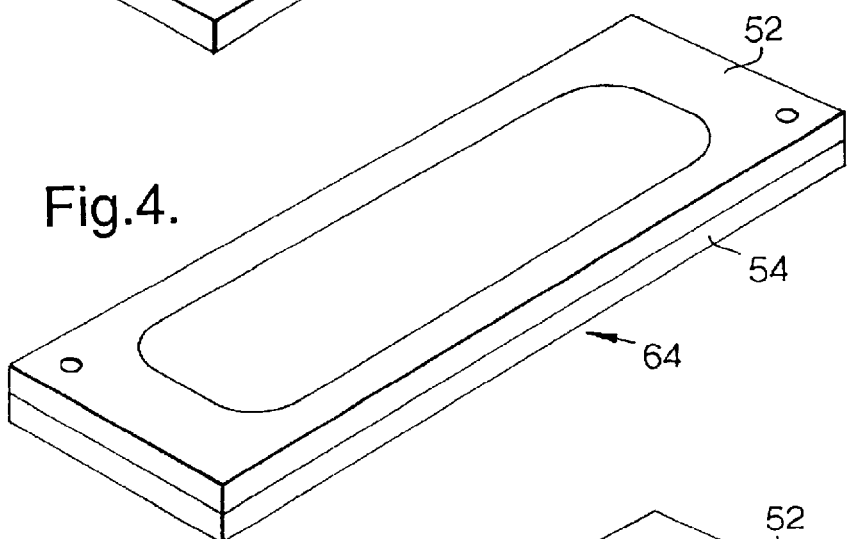
FIG. 4 is a view of the stack of sheet metal workpieces shown in FIG. 3 after sealing to form a sealed structure.

Each fan outlet guide vane 34 is manufactured, as shown in FIGS. 3 to 6 by selecting two sheet titanium alloy workpieces 52 and 54. The titanium alloy workpiece 52 is thicker than the titanium alloy workpiece 54. The titanium alloy is preferably an alloy comprising 6 wt % aluminium, 4 wt % vanadium and the balance is titanium plus incidental impurities. Referring initially to FIG. 3, the titanium alloy workpiece 52 is initially machined on one side to produce contoured surface 56 respectively to produce a predetermined mass distribution from edge to edge and from end to end. The other sides have flat surfaces 60 and 62 respectively. The titanium alloy workpieces 52 and 54 define the outer profile of the fan outlet guide vane 34. A stop off material 63 is applied in a predetermined pattern to the flat surface 60 or 62 of one of the titanium alloy workpieces 52 and 54 respectively. The stop off material prevents diffusion bonding occurring between the flat surfaces 60 and 62 in the predetermined pattern. The titanium alloy workpieces 52 and 54 are then stacked together so that the flat surfaces 60 and 62 are in mating abutment. The edges and ends of the titanium alloy workpieces 52 and 54 are sealed together, for example by welding, to form a sealed structure 64, as shown in FIG. 4. The sealed structure 64 is then heated and purged with air to remove the binder in the stop off from the sealed structure 64.

Figure 5:
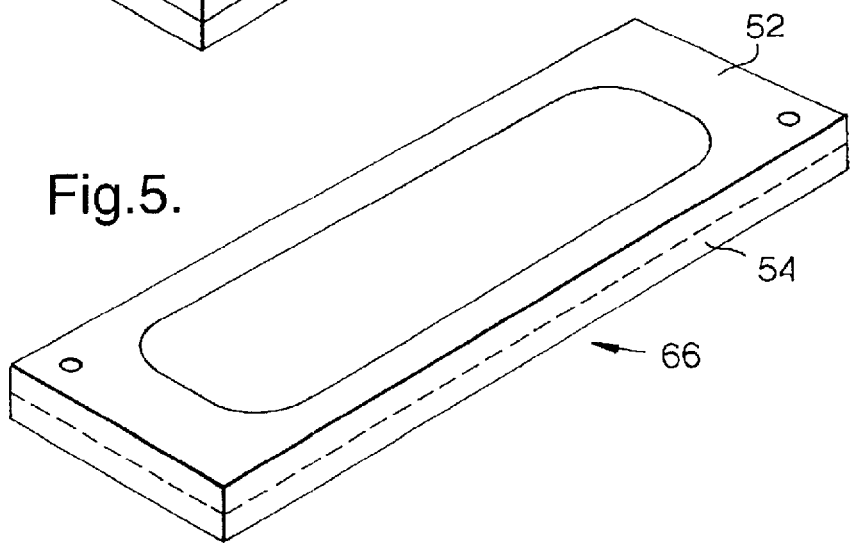
FIG. 5 is a view of the stack of sheet metal workpieces shown in FIG. 4 after diffusion bonding to form an integral structure.

After the binder has been removed from the sealed structure 64, the sealed structure 64 is evacuated, heated to a suitable temperature and a suitable pressure is applied for a predetermined time to diffusion bond the titanium alloy workpieces 52 and 54 together in areas other than those covered by the stop off to form an integral structure 66, as shown in FIG. 5. For example the sealed structure 64 is heated to a temperature greater than 850° C., e.g. 900° C. to 950° C. and a pressure of 300 lbs per square inch (2.0 MPa) to 450 lbs per square inch (3.0 MPa) is applied for 2 hours.

The integral structure 66 is then heated to a suitable temperature, greater than 850° C., and is hot formed to produce an aerofoil shape.

Figure 6:
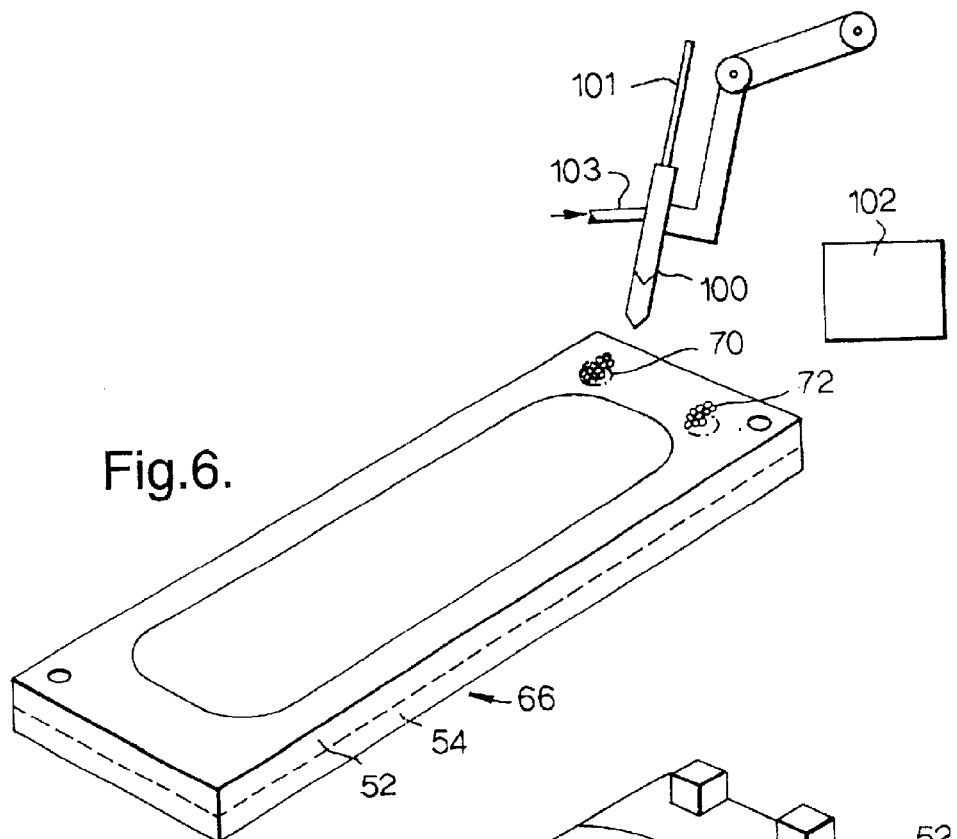
FIG. 6 is a view of the hot-formed integral structure shown in FIG. 5 during deposition of metal to form bosses at one end of the integral structure.

A robot-welding torch 100 under the control of a computer 102 is arranged to deposit a suitable titanium alloy at one or more ends of the integral structure 66, as shown in FIG. 6. In particular the robot-welding torch 100 is arranged to deposit a suitable titanium alloy at the axially spaced positions, or regions, 70 and 72 on the titanium alloy workpiece 52. The robot-welding torch 100 is arranged to deposit the titanium alloy in a predetermined shape and to a predetermined depth to form the reinforcing bosses 42 and 44 at each of the positions, or regions, 70 and 72 respectively on the titanium alloy workpiece 52. The robot-welding torch 100 is moved in a controlled manner under instructions from the computer 102.

The robot-welding torch 100 comprises a nine-axis robot, not shown. An example of a nine axis robot is produced by Reis Robotics GMBh (of Obernburg Germany) using their Reis SRV16 robot arm mounted in the hanging position from a gantry with 1 m of vertical travel coupled to their Reis RDK26 rotary tilting table module and the whole robot is driven by a Reis robot controller.

The robot welding torch 100 comprises an arc welding torch for example a tungsten inert gas (TIG), or metal inert gas (MIG). The welding torch 100 is supplied with power, welding wire 101 and protective gas via a pipe 103. Alternatively other suitable welding torches may be used for example a laser welding torch.

Figure 7:
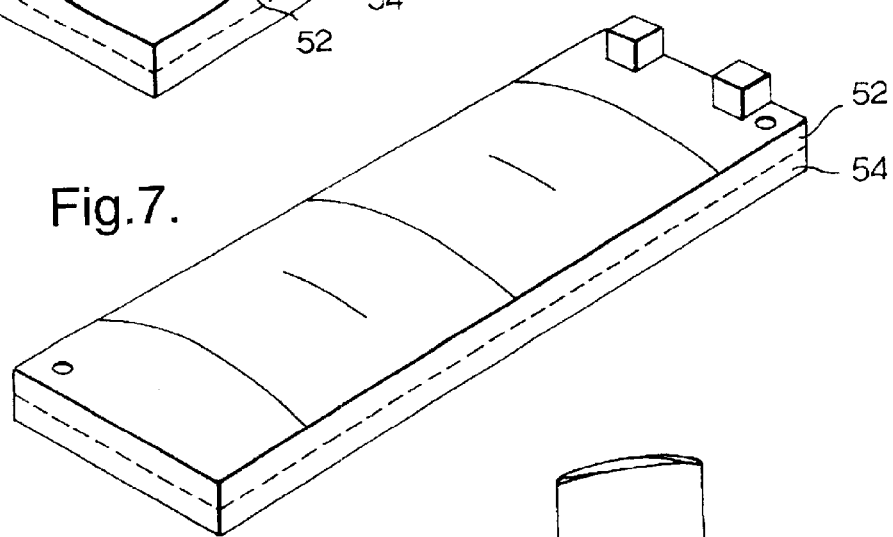
FIG. 7 is a view of the integral structure shown in FIG. 6 after heating and hot forming.

An inert gas is then supplied to the interior of the integral structure 66 to break the adhesive bond brought about during the diffusion bonding pressure where the predetermined pattern of stop off was applied. The integral structure 66 is then placed in an aerofoil shaped die, is heated to a suitable temperature and then an inert gas is supplied to the interior of the integral structure 66 to hot form the titanium alloy workpieces 52 and 54 to the shape of the dies to produce a hollow integral structure 68, as shown in FIG. 7. For example the integral structure 68 is heated to a temperature greater than 850° C., e.g. 900° C. to 950° C. The integral structure 68 is substantially that of a finished fan outlet guide vane 34. The superplastic forming process is used to stress relieve the weld deposited titanium alloy.

The bosses 42 and 44 are subsequently machined, drilled, to form apertures 46 and 48 therethrough.

The advantage of the present invention is the titanium alloy workpieces are longer than in the prior art. Thus more of the fan outlet guide vane radial length is hollow, and hence this produces a reduction in weight of the fan outlet guide vane. Hence a reduction in weight of the gas turbine engine. The bosses produced by the deposition of the weld metal are produced to net shape and do not require further machining, except for the apertures to receive the fasteners. The bosses produced by the deposition of weld metal eliminates the need to forge locally thickened end pieces which are machined to form bosses and which are subsequently welded to the fan outlet guide vanes. Additionally the process of the present invention is cheaper than the prior art process.

It may be possible to deposit a suitable titanium alloy at the axially spaced positions 70 and 72 on the titanium alloy workpieces 52 and 54 to form one or more bosses on each side of the integral 68.

It may be possible to deposit a suitable titanium alloy at axially spaced positions at the radially inner end and at the radially outer end of the titanium alloy workpieces.

It may be possible to manufacture the fan outlet guide vanes from other suitable titanium alloys, other suitable metals or suitable alloys. For example INCO718, which comprises 19 wt % Cr, 18 wt % Fe, 5 wt % Nb, 3 wt % Mo, 0.9 wt % Ti, 0.5 wt % Al and the balance Ni plus incidental impurities.

Figure 8:
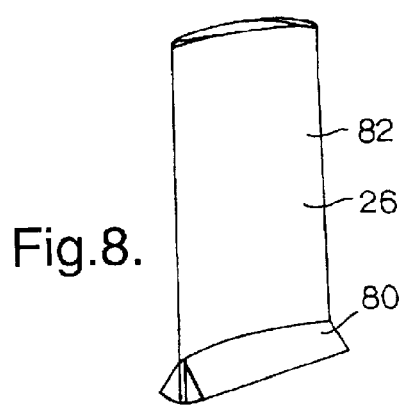
FIG. 8 is an enlarged view of a sheet metal fan blade manufactured according to the present invention.

Each fan blade 26, as shown more clearly in FIG. 8, comprises a root portion 80 and an aerofoil portion 82. The root portion 80 comprises a dovetail root. The root portion 80 of the fan blade 26 enables the fan blade 26 to be secured to a correspondingly shaped slot in the fan rotor 24. The fan blade 26 comprises a hollow integral structure, which has been formed by diffusion bonding and superplastic forming three sheet metal workpieces.

Each fan blade 26 is manufactured using substantially the same process as that used for manufacturing the fan outlet guide vane 34, but using three sheet titanium alloy workpieces. A first and a second of the titanium alloy workpieces are initially machined on one side to produce a predetermined mass distribution from edge to edge and from end to end, of the fan blade 26. The first and second titanium alloy workpieces define the outer profile of the fan blade 26. A stop off material is applied in a predetermined pattern to the flat surface of at least one of the titanium alloy workpieces. The titanium alloy workpieces are then stacked together so that the flat surfaces are in mating abutment and the third of the titanium alloy workpieces is between the first and second titanium alloy workpieces. The stack of titanium alloy workpieces is then diffusion bonded together to form an integral structure.

A welding torch under the control of a computer is arranged to deposit a suitable titanium alloy at one end of the integral structure. In particular the welding torch is arranged to deposit a suitable titanium alloy on the first and second titanium alloy workpieces. The welding torch is arranged to deposit the titanium alloy in a predetermined shape and to a predetermined depth to form the dovetail shaped root to net shape on the first and second titanium alloy workpieces. The welding torch may be arranged to deposit the titanium alloy by moving the welding torch parallel to the surfaces of the first and second titanium alloy workpieces and parallel to the inner end of the fan blade. Alternatively the welding torch be arranged to deposit the titanium alloy by moving the welding torch parallel to the surfaces of the first and second titanium alloy workpieces and parallel to the radially extending edges of the fan blade.

The integral structure is then placed in an aerofoil shaped die, is heated to a suitable temperature and then an inert gas is supplied to the interior of the integral structure to hot form the first and second titanium alloy workpieces to the shape of the dies and to superplastically form the third titanium alloy workpiece to produce a hollow integral structure. The integral structure is substantially that of a finished fan blade. The superplastic forming process is used to stress relieve the weld deposited titanium alloy.

The advantage of the present invention is that thinner sheet metal titanium may be used to form the fan blade and the root is formed by weld deposition.

It may be possible to deposit the titanium alloy in a predetermined shape and to a predetermined depth to form a firtree shaped root on the first and second titanium alloy workpieces.

It may be possible to manufacture the fan blades from other suitable titanium alloys, other suitable metals or other suitable alloys. For example a nickel alloy INCO718.

Generally the metal or alloy of the weld deposition is substantially the same metal or alloy as the metal workpieces.

It may be possible to manufacture sheet metal compressor vanes, sheet metal compressor blades, sheet metal turbine vanes, sheet metal turbine blades or other sheet metal articles or components using the same process.

It may be possible to manufacture sheet metal articles with other types of attachment features or other types of features using the method of the present invention.

I claim:

1. A method of manufacturing a sheet metal article comprising selecting at least two sheet metal workpieces, assembling the at least two sheet metal workpieces in a stack of sheet metal workpieces, sealing the edges of the stack of sheet metal workpieces, diffusing bonding the stack of sheet metal workpieces in areas other than a predetermined pattern to form an integral structure, weld-depositing metal at at least one predetermined position and in a predetermined shape to build up a feature to net shape at the at least one predetermined position on the integral structure, and then heating the integral structure and internally pressuring the interior of the integral structure to hot form at least one of the at least two metal workpieces to form a hollow integral structure of predetermined shape.

2. A method as claimed in claim 1 comprising weld-depositing metal at at least one predetermined position at one end of the hollow integral structure.

3. A method as claimed in claim 1 comprising weld-depositing metal at two predetermined positions.

4. A method as claimed in claim 3 comprising weld-depositing metal at both ends of the hollow integral structure, weld-depositing the metal in a predetermined position and in a predetermined shape to build up features to net shape at both ends of the hollow integral structure.

5. A method as claimed in claim 3 comprising weld-depositing metal at both sides at one end of the hollow integral structure, depositing the metal in a predetermined position and in a predetermined shape to build up a feature to net shape at both sides of the hollow integral structure.

6. A method as claimed in claim 3 comprising weld-depositing metal at one end and at one side of the hollow integral structure, depositing the metal in a predetermined position and in a predetermined shape to build up a feature to net shape at one end and on one side of the hollow integral structure.

7. A method as claimed in claim 1 wherein the article is selected from the group comprising a fan outlet guide vane and a compressor vane.

8. A method as claimed in claim 1 comprising weld-depositing the metal to build up a boss at at least one end of the article.

9. A method as claimed in claim 8 comprising drilling an aperture through the boss.

10. A method as claimed in claim 1 wherein the article is selected from the group comprising a fan blade and compressor blade.

11. A method as claimed in claim 8 comprising weld-depositing the metal to build up a dovetail root or a firtree root at one end of the article.

12. A method as claimed in claim 1 wherein the sheet metal article is selected from the group comprising titanium and a titanium alloy.

13. A method as claimed in claim 12 comprising weld-depositing a metal from the group comprising titanium and a titanium alloy.

14. A method as claimed in claim 12 or claim 13 wherein the titanium alloy comprises 6 wt % Al, 4 wt % vanadium and the balance is titanium plus incidental impurities.

15. A method as claimed in claim 1 wherein the sheet metal article comprises a nickel alloy.

16. A method as claimed in claim 15 comprising weld-depositing a metal from the group comprising nickel and a nickel alloy.

17. A method as claimed in claim 16 wherein the nickel alloy comprises 19 wt % Cr, 18 wt % Fe, 5 wt %Nb, 3 wt % Mo, 0.9 wt % Ti, 0.5 wt % Al and the balance Ni plus incidental impurities.

18. A method as claimed in claim 1 comprising applying a stop off material in a predetermined pattern to at least one surface of at least one of the at least two sheet metal workpieces, before assembling the least two sheet metal workpieces in a stack of sheet metal workpieces.

* * * * *